United States Patent [19]

Stanley

[11] 4,098,528

[45] Jul. 4, 1978

[54] PIPE COUPLING

[75] Inventor: John M. Stanley, Milledgeville, Ga.

[73] Assignee: AMSTED Industries Incorporated, Chicago, Ill.

[21] Appl. No.: 671,130

[22] Filed: Mar. 29, 1976

[51] Int. Cl.² ............................................. F16L 21/00
[52] U.S. Cl. .................................... 285/235; 285/369; 285/423
[58] Field of Search ............... 285/235, 236, 369, 423, 285/229, 383; 138/124, 125, 126, 137, 172, 174, 177

[56] References Cited

U.S. PATENT DOCUMENTS

| | | | |
|---|---|---|---|
| 3,104,898 | 9/1963 | MacDonald et al. | 285/DIG. 12 |
| 3,233,907 | 2/1966 | Stanton | 285/DIG. 12 |
| 3,284,110 | 11/1966 | Marcus et al. | 285/235 |
| 3,394,952 | 7/1968 | Garrett | 285/383 X |
| 3,462,175 | 8/1969 | Johnson | 285/423 X |
| 3,558,164 | 1/1971 | Havell | 285/423 X |
| 3,612,580 | 10/1971 | Jones | 285/423 X |
| 3,979,142 | 9/1976 | Fujisawa | 285/423 |

FOREIGN PATENT DOCUMENTS

| | | | |
|---|---|---|---|
| 2,232,239 | 12/1974 | France | 285/229 |
| 356,507 | 10/1961 | Switzerland | 285/332 |

Primary Examiner—Dave W. Arola
Attorney, Agent, or Firm—Fred P. Kostka

[57] ABSTRACT

There is provided a pipe coupling for plain-end relatively rigid pipe formed of spaced outer gripping zones of relatively soft material and containing biased continuous filament strands embedded therein, and an intermediate zone of tough hard material with discontinuous reinforcement embedded therein.

13 Claims, 2 Drawing Figures

U.S. Patent  July 4, 1978  4,098,528
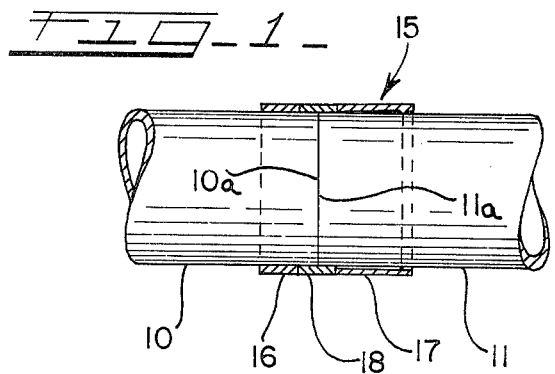
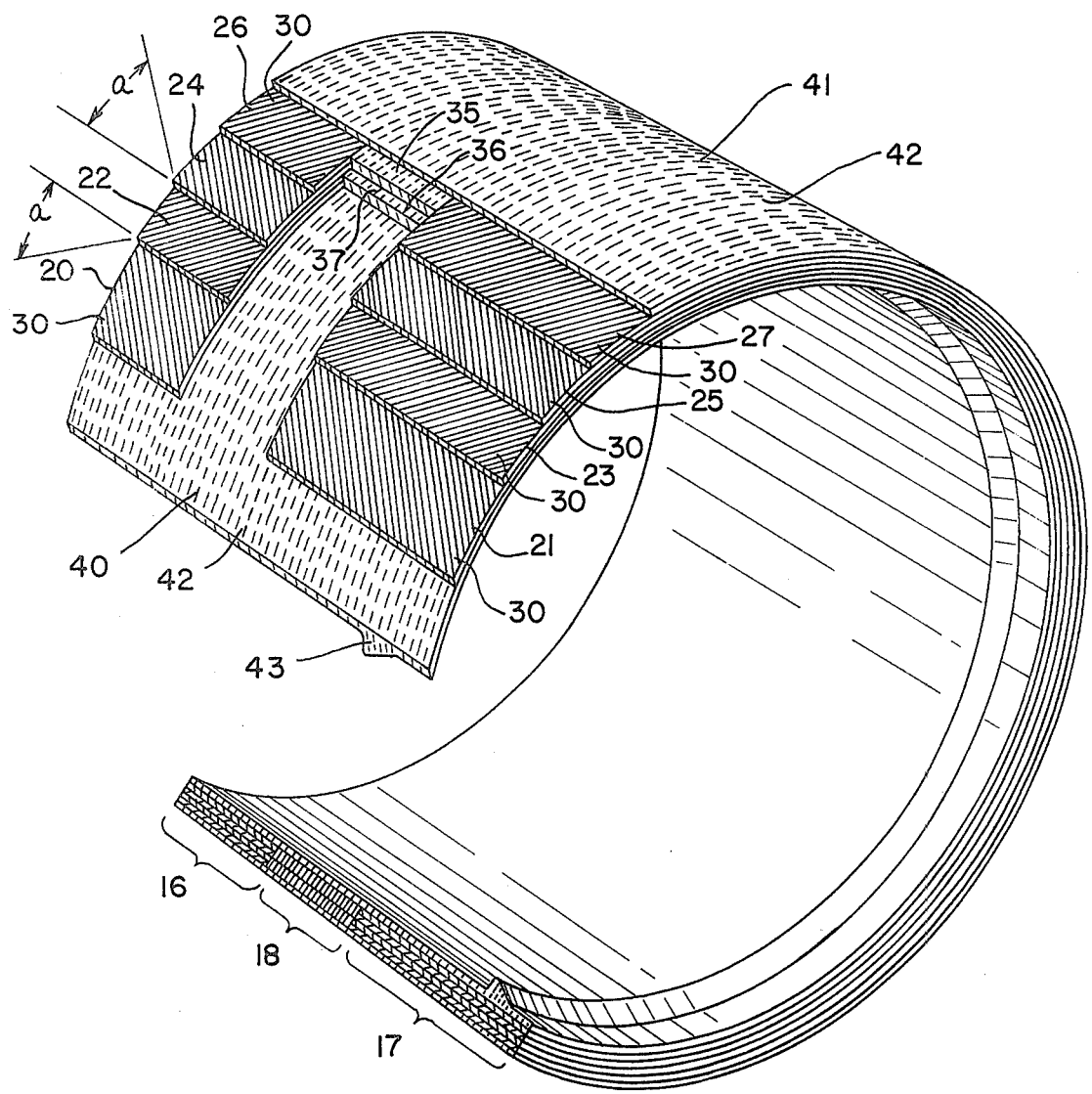

PIPE COUPLING

BACKGROUND AND SUMMARY OF THE INVENTION

The present invention relates to a pipe coupling for plain-end relatively rigid pipes, and more specifically to such a pipe coupling which permits the adjacent pipe ends to be assembled with the coupling merely by inserting the pipe ends into the coupling. The pipe coupling must firmly grip the pipe ends to resist any tendency of the pipe ends to separate.

Pipe couplings of the type described are known wherein reverse biased continuous filament strands are embedded within coupling so that the strands will tighten and compress around the ends of a pipe if there is any tendency of the pipe ends to separate.

The coupling must resist not only tendency of the pipe ends to separate in an axial direction, but must also resist separation of the pipe ends radially from each other, that is, that the pipe coupling must resist in shear the tendency of the pipe ends to move out of axial alignment. It was found that the pipe coupling described above would develop leaks in a plane at right angles in either direction relative to the line of shear force. It is believed that due to the low elongation properties of the continuous filament strands customarily used, this mechanical action was upsetting the seal at the point of leak-field end terminating at right angles away and in line with the shear load.

Accordingly, it is an object of the present invention to provide a new and improved pipe coupling.

It is an object of the present invention to provide a new and improved coupling which overcomes the above-mentioned difficulties.

In accordance with the present invention there is provided a pipe coupling for plain-end relatively rigid pipe provided with relatively soft, spaced outer gripping zones and an inner zone of hard, tough material. Preferably the spaced outer gripping zones have embedded therein cross biased continuous filament strands and the inner zone is reinforced with discontinuous filament strands embedded therein.

Further features will appear hereinafter.

BRIEF DESCRIPTION OF THE DRAWINGS

FIG. 1 is an elevational view, partly in section, illustrating a set of plain-end pipes joined with the pipe coupling according to the present invention; and FIG. 2 is a fragmentary perspective view of the pipe coupling according to the present invention.

DESCRIPTION OF THE PREFERRED EMBODIMENT

Referring now to the drawings there is fragmentarily illustrated in FIG. 1 a pair of plain-end pipes 10, 11 having abutting ends 10a, 11a and joined by a pipe coupling 15 according to the present invention. The pipe coupling 15 includes spaced outer gripping zones 16, 17 of relatively soft material, and an inner zone 18 of hard, tough material.

Referring now to FIG. 2 the pipe coupling 15 includes the spaced outer zones 16, 17 formed of a plurality of plies 20, 21; 22, 23; 24, 25; and 26, 27. Each of the plies 20 to 27 is formed of a relatively soft elastic material such as natual rubber or soft elastomer and may come in a preferred embodiment, have a durometer hardness of 65 of 85 shore A. Each of the plies 20 to 27 has embedded therein reinforcing filament strands 30 which are preferably cross-biased at an angle a to provide reinforcement and tightening of the zones 16, 17 upon the ends 10a, 11a of the pipe upon elongation or pull on the coupling 15. In the illustrated embodiment the strands 30 are cross-biased at the angle $a$ of 54°, which has been found to function satisfactorily.

The inner zone 18 is formed of a harder, tougher material such as an ethylene propylene having a durometer hardness of 85 to 95 shore A. Nordell No. 3502 has been found satisfactory for the inner zone. The inner zone 18 is formed of layers 35, 36 having embedded therein reinforcing, discontinuous filament strands 37 of suitable reinforcing filament material such as glass fiber. The filament strands are oriented peripherally around the circumference of the coupler, but are discontinuous and, in the illustrated embodiment, may be chopped at $\frac{1}{4}$ inch long.

In a preferred embodiment the coupler 15 additionally includes an inner cover 40 and an outer cover 41, also of relatively soft material such as an elastomer or ethylene propylene having a durometer hardness of 45 to 55 shore A. The inner and outer covers 40 and 41 are reinforced in the illustrated embodiment by discontinuous filament strands 42 of glass fiber or other suitable material oriented peripherally around the circumference of the coupling and chopped in short lengths, such as $\frac{1}{4}$ inch long. Advantageously, the inner cover 40 may have an inwardly projecting rib or bead 43 formed integrally therewith.

It will be understood that the pipe coupling 15 is vulcanized or otherwise cured into a unitary structure through the inner and outer covers 40 and 41. Thus during the vulcanizing process the inner zone 18 plies 35 and 36 are bonded directly to the inner and outer covers 40 and 41 together to form a monolithic shear ring laying directly over the ends of the field joined pipe, as illustrated in FIG. 1. This provides a super tough inner ring with peripheral running discontinuous reinforcement that is attached to the bias plies 20 to 27 only through the inner and outer covers 40, 41.

In a preferred commercial application of the pipe coupling 15, the pipe coupling 15 will be factory joined, as by adhesive or vulcanizing, to one pipe end, here illustrated as end 10a of pipe 10. The adjacent pipe 11 is then field joined by inserting the free end 11a thereof into the free end of the pipe coupling. Thus the outer zone 16 may be shorter than the outer zone 17, and in the illustrated embodiment the zone 16 is $1\frac{1}{2}$ inches long; the zone 17 is 3 inches long; and the zone 18 is $1\frac{1}{2}$ inches long.

It should be understood that the arrangement described above constitutes the preferred embodiment and that many adaptations and modifications may be made without departing from the spirit of the invention.

I claim:

1. A pipe coupling for coupling adjacent ends of a first rigid plain end pipe section and a second rigid plain end pipe section disposed in end to end relationship comprising a tubular member including:

a pair of axially spaced gripping zones of relatively soft material for grippingly engaging said plain end pipe sections, one of said gripping zones being disposable over the exterior circumferential surface of one end of one of said pipe sections and the other of said gripping zones being disposable over the exterior circumferential surface of the adjacent end of the other of said pipe sections;

a central zone having a substantially constant inner diameter, said central zone disposed between said gripping zones to overlay the adjacent ends of both pipe sections, said central zone being of a material which is relatively hard with respect to said relatively soft material so as to resist axial misalignment of the adjacent ends of said plain end pipe sections; and means connecting said spaced gripping zones and said central zone to form a unitary coupling structure.

2. A pipe coupling as set forth in claim 1 wherein said relatively soft material is natural rubber.

3. A pipe coupling as set forth in claim 1 wherein said central zone has a durometer hardness of approximately 85 to 95 shore A.

4. A pipe coupling as set forth in claim 1 wherein said connecting means includes a radially outer cover spanning across said gripping zones and said central zone and formed of relatively tough, hard material having reinforcing discontinuous filament strands embedded therein.

5. A pipe coupling as set forth in claim 1 wherein cross-biased continuous filament strands are embedded in said gripping zones.

6. A pipe coupling as set forth in claim 5 wherein said biased strands are arranged in layers of cross biased filaments.

7. A pipe coupling as set forth in claim 6 wherein said biased strands are oriented at approximately 54° to the longitudinal axis of the coupling.

8. A pipe coupling as set forth in claim 7 wherein said biased strands are formed of glass fibers.

9. A pipe coupling as set forth in claim 1 wherein reinforcing discontinuous filament strands are embedded in said central zone.

10. A pipe coupling as set forth in claim 9 wherein said reinforcing strands are oriented peripherally around the circumference.

11. A pipe coupling as set forth in claim 10 wherein said reinforcing strands are formed of glass fibers in the range of ¼ inch long.

12. A pipe coupling as set forth in claim 1 wherein said connecting means includes a radially inner cover spanning across said gripping zones and said central zone and formed of a relatively soft material having reinforcing discontinuous filament strands embedded therein.

13. A pipe coupling as set forth in claim 12 and including an inwardly projecting rib integrally formed with said inner cover near one end of said coupling.

* * * * *